United States Patent
Hinde et al.

(10) Patent No.: US 6,776,287 B1
(45) Date of Patent: Aug. 17, 2004

(54) WATER SOLUBLE FILMS

(75) Inventors: David Charles Hinde, Manchester (GB); Gerardus Cornelis Overbeek, Waalwijk (NL); John Christopher Padget, Cheshire (GB); Phillip Cheshire, Manchester (GB); Terence Yeates, Manchester (GB); Yvonne Wilhelmina Smak, Waalwijk (NL)

(73) Assignee: Aquasol Limited, Essex (GB)

( * ) Notice: Subject to any disclaimer, the term of this patent is extended or adjusted under 35 U.S.C. 154(b) by 0 days.

(21) Appl. No.: 09/623,427

(22) PCT Filed: Feb. 25, 1999

(86) PCT No.: PCT/GB99/00425
§ 371 (c)(1),
(2), (4) Date: Nov. 22, 2000

(87) PCT Pub. No.: WO99/45050
PCT Pub. Date: Sep. 10, 1999

(30) Foreign Application Priority Data

Mar. 3, 1998 (GB) ............................................. 9804456
Mar. 12, 1998 (GB) ............................................. 9805250

(51) Int. Cl.$^7$ ........................ B65D 53/06; B65D 53/00; B65D 83/00; B32B 27/40; C08G 18/48
(52) U.S. Cl. ................. 206/524.1; 206/484; 206/524.2; 428/423.1; 524/591; 524/839; 524/840; 528/59; 528/61; 528/71; 528/76
(58) Field of Search ............................. 206/484, 524.1, 206/524.2; 428/423.1; 524/591, 839, 840; 528/59, 61, 71, 76

(56) References Cited

U.S. PATENT DOCUMENTS

| 4,150,946 A |   | 4/1979  | Neel et al. ..................... 528/71 |
|-------------|---|---------|------------------------------------------|
| 4,501,852 A | * | 2/1985  | Markusch et al. .......... 524/591        |
| 4,871,798 A | * | 10/1989 | Dormish et al. ............. 524/591      |
| 5,432,228 A | * | 7/1995  | Hilken et al. ................ 524/591    |
| 5,626,840 A |   | 5/1997  | Thomaides et al. ....... 424/70.11        |
| 5,708,073 A |   | 1/1998  | Dodge et al. ................ 524/590     |
| 6,071,618 A | * | 6/2000  | Cook et al. .................. 428/412    |

FOREIGN PATENT DOCUMENTS

| DE | 42 25 045 | 2/1994  |
| EP | 619 111   | 10/1994 |

OTHER PUBLICATIONS

Database WPI, Week 9410, Derwent Publications Ltd., AN 80121, XP002103808, "Water Soluble Film For Wraping Seeds, Medicine, Bath Additives and Insecticides", & JP 06 032976, Feb. 8, 1994.

* cited by examiner

Primary Examiner—Rabon Sergent
(74) Attorney, Agent, or Firm—Pillsbury Winthrop LLP

(57) ABSTRACT

Water-soluble films suitable for water-dissolvable packaging comprising a polyurethane polymer having defined amounts of poly(ethylene oxide) (and optionally poly(propylene oxide)) groups and acid (preferably carboxyl) groups at least 50% neutralised with a base, at least a proportion of which is of the non-volatile type, the polyurethane being made by chain extension of a urethane prepolymer. Also water-soluble packaging (sachets, capsules, bags) made from the films and their use in packaging various materials, and a process for the production of aqueous polyurethane solutions which may be used for making such films.

6 Claims, No Drawings

WATER SOLUBLE FILMS

The present invention relates to water-soluble films suitable for the preparation of water-soluble packaging, e.g. sachets, capsules and bags, and to water-soluble packaging made from such films and to the production of aqueous polymer solutions which may be used for making such films.

Water-dissolvable packaging, particularly of the type provided by sachets, capsules and bags, have utility for packaging and delivering a range of materials, usually formulated compositions, and particularly formulated compositions which are hazardous (or at any rate unpleasant) to individuals with whom they come into contact or are hazardous or harmful to the environment. Examples include agrochemicals compositions (e.g. insecticides, herbicides, pesticides and fungicides), pharmaceutical compositions, laundry care products (e.g. detergents, fabric softeners and bleaches), dyestuffs, biocides, industrial or home cleaners, and public health products. The use of water-soluble packaging for packaging certain formulated compositions also provides a convenient way of adding a measured dosage of the formulation for subsequent dilution with water in order to provide the desired final concentration of the diluted formulation.

Polyvinyl alcohol (PVA) has been widely utilised for the preparation of water dissolvable film for the production of sachets for packaging hazardous materials such as agrochemicals; methyl cellulose is also widely utilised (see e.g. WO 93/22215). Such polymers however have limitations. For example, it is necessary to incorporate plasticisers to achieve the desired level of flexibility; also such films have poor heat seal characteristics in the absence of plasticisers; however plasticisers can migrate out of the film to render it brittle. Still further, the presence of reactable hydroxyl groups in such films restricts their use for packaging hydroxyl-reactive compounds. Yet still further such films are insolubilised by borates (used in laundry care).

It has also been proposed to employ carboxylated acrylic polymers for making water-dissolvable films for the production of water-soluble packaging (sachets, and the like). Such films, however, tend to have poor mechanical properties.

We have now discovered certain polyurethane films which are water-soluble and are suitable for the provision of water-dissolvable packaging (sachets, capsules, bags etc) for packaging. Such films, can e.g, have improved solubility in cold water compared to conventional PVA films; also unlike the PVA films, there is no need for externally added plasticiser (although plasticiser can be added if desired). Such films also have good mechanical properties and good heat seal characteristics without the need for added plasticisers.

According to the present invention there is provided a water-soluble film comprising a polyurethane polymer(s), which polyurethane polymer(s) has:

0 to 35 weight %, based on the weight of polyurethane polymer, of poly(ethylene oxide) groups which have a chain length(s) corresponding to a number average molecular weight within the range of from 200 to 5000 Daltons;

15 to 150 milliequivalents, per 100 g of polyurethane polymer, of acid-functional groups, and wherein at least 50% of the acid-functional groups are neutralised, such neutralisation being with a base(s) at least part of which is a non-volatile base(s); and said polyurethane polymer(s) is a chain extended product formed using:

(A) a prepolymer component comprising an isocyanate-terminated polyurethane prepolymer, said component being formed from reactants which comprise:

(i) at least one organic polyisocyanate;
(ii) if poly(ethylene oxide) groups are present, at least one isocyanate-reactive compound providing said poly(ethylene oxide) groups in the resulting polyurethane polymer; and
(iii) at least one isocyanate-reactive compound providing said acid-functional groups in the resulting polyurethane polymer, and (B) an active hydrogen component comprising an active hydrogen chain-extending compound(s).

The polyurethane films of the invention are normally made from an aqueous solution of the polyurethane, e.g. by casting. Alternatively dry polymer may be recovered from an aqueous solution (e.g. by spray drying or freeze drying, whereby any cosolvent used in its synthesis can be removed) and the film then formed by a) redissolving the polymer in water and applying (casting, spraying or doctor blading) to a substrate or b) melt processing (e.g. slit extension or blown film formation).

Therefore there is further provided according to the invention an aqueous solution of a polyurethane polymer as defined supra.

There is further provided according to the invention water-soluble packaging, particularly a sachet, capsule or bag, in which the enveloping film of the packaging comprises a polyurethane polymer film as defined supra.

There is further provided according to the invention the use of packaging as defined supra for packaging a material.

There is further provided according to the invention the combination of a water-soluble packaging as defined supra and a material packaged therein.

It has been proposed in JP-A-2102225 to use certain polyurethane polymers containing poly(ethylene oxide) groups and optionally (inter alia) acid-functional groups for the provision of water-soluble films for packaging. Such polyurethanes, however, have poly(ethylene oxide) groups with molecular weight of 6000 or more, and may contain acid-functional groups which if present are preferably at a very low level. Moreover the minimum amount of poly (ethylene oxide) in the polyurethane is about 69 weight % based on the weight of the polyurethane. Such a compositional make-up conspires to make the resulting films inferior to those of the present invention, particularly with regard to inferior mechanical properties and film softness-the high amount of poly(ethylene oxide) causing excessive moisture uptake, particularly in high humidity conditions.

Water-soluble films formed from certain polyurethane polymers have also been disclosed in JP-A-6032976, where such polymers are derived from polyoxyethylerie polyols and polyisocyanates. The. poly(ethylene oxide) group content in such polyurethanes is at least 50 weight %, and there is no disclosure or suggestion that acid groups should also be present. The resulting films are inferior to those of the present invention, e.g. having inferior mechanical properties due to the very high amount of poly(ethylene oxide) groups.

It is preferred that the polyurethane film is cold water-soluble since it may be difficult in some applications (e.g. large scale outdoor use as might be encountered when dispensing agrochemical materials) to provide hot water for dissolving the packaging. Cold water-soluble means herein soluble in water at temperatures $\leq 35°$ C., and generally between 5 and 35° C. (Note that if the film is cold water-soluble it will usually be hot water soluble as well, i.e. soluble at water temperatures $>35°$ C.—e.g. up to 70° C. or above).

The poly(ethylene oxide) (hereinafter PEO) groups are preferably present in the polyurethane polymer in an amount within the range 2 to 35 weight % based on the weight (dry) of the polyurethane polymer, more preferably 2 to 20 weight %, and especially 2 to 15 weight %. Other preferred ranges are 5 to 35 weight % based on the dry weight of the polyurethane polymer, more preferably 5 to 20 weight % and especially 5 to 15 weight %. Above a level of 35 weight %, the resulting film tends to be unacceptably soft and of extremely inferior mechanical strength.

The PEO chains may be in-chain in the polyurethane polymer, or may be chain-pendant to the urethane backbone, or some may be in-chain and some may be chain-pendant. Also some of the PEO groups may be chain-terminal, e.g. at the end of a urethane chain. Usually, the PEO units are at least in-chain. The PEO groups, if present, contribute to the water-solubility and flexibility of the film.

The number average molecular weight of the PEO groups should be within the range of 200 to 5000 Daltons, preferably 300 to 3000 Daltons, and more preferably 500 to 2000 Daltons. The number average molecular weight of the PEO groups will normally be known because the reactant(s) used to incorporate such groups, e.g. a polyoxyethylene diol(s), is normally commercially available and the manufacturer usually specifies the molecular weight of the compound. If not known, the number average molecular weight may be determined by gel permeation chromatography using a PEO compound (e.g. a diol) of known molecular weight as a standard, or by end-group titration/analysis.

PEO groups are normally introduced into the polyurethane by employing in the polyurethane prepolymer synthesis an isocyanate-reactive compound which incorporates a poly(ethylene oxide) chain(s) as a group(s) therein. Preferably, the isocyanate-reactive group is a hydroxyl group, and polyols, diols, and (in some cases) monohydroxy compounds may be used; preferably diols are employed. Typically the isocyanate-reactive compound is a polyoxyethylene polyol, particularly a polyoxyethylene diol. Polyoxyethylene diols way be made e.g. by polymerisation of ethylene oxide under alkaline conditions, or by the addition of ethylene oxide to an initiator such as ethylene glycol or propylene glycol in the presence of a base (e.g. KOH or NaOH), or by the condensation polymerisation of ethylene glycol (to produce poly(ethylene glycol)). Such synthetic procedures are all well known to the art.

The use of polyoxyethylene diols will form in-chain PEO groups. Chain-pendant PEO groups may be introduced by employing in the prepolymer synthesis diols having pendant PEO chains, e.g. those described in U.S. Pat. No. 3,905,929. In U.S. Pat. No. 3,905,929 examples of such compounds are disclosed which may be obtained by reacting one mole of an organic diisocyanate in which the two isocyanate groups have different reactivities with approximately one mole of a polyethylene glycol mono-ether and then reacting the adduct so obtained with approximately one mole of a dialkanolamine, for example diethanolamine. Chain-pendant PEO groups may also be introduced by employing in the prepolymer synthesis certain amine and hydroxyl functional compounds, or diols, as disclosed in EP 0317258, where such compounds are obtained by oxyalkylating a defined polyether amine containing PEO residues.

The polyurethane polymer may optionally, but in many cases usefully, incorporate poly(propylene oxide) (hereinafter PPO) chains, which, as for the PEO chains, may be in-chain, chain-pendant or both in-chain and chain-pendant (and sometimes may also be terminal); usually the PPO chains (as with the PEO chains) are at least in-chain. The presence of PPO chains can advantageously improve the hardness of the film without excessively sacrificing good water solubility.

PPO groups may be introduced in the same manner as described above for introducing PEO groups, but using the analogous PPO-resulting compounds instead of PEO-resulting compounds in the prepolymer synthesis (e.g. to produce polypropyleneoxide diols, one may polymerise propylene oxide, or add propylene oxide to an initiator, or one may condensation polymerise propylene glycol to form poly(propylene glycol)). Chains containing both PEO and PPO units may also be used for incorporating the PEO and PPO groups, e.g. poly(oxyethylene-oxypropylene) diols obtained by the simultaneous or sequential addition of ethylene and propylene oxides to appropriate initiators.

PPO groups are preferably present in the polyurethane polymer in amount 0 to 60 weight %, based on the (dry) weight of the polyurethane polymer, more preferably 0 to 45 weight %, still more preferably 5 to 45 weight %. The number average molecular weight of the PPO chains, if present, should preferably be within the range of 200 to 5000 Daltons, more preferably 400 to 5000 Daltons, more preferably 500 to 3000 Daltons. (With regard to the knowledge or determination of the molecular weight of the PPO groups, the same considerations apply mutatis mutandis as for PEO groups discussed above).

The organic polyisocyanate used in making the prepolymer may be an aliphatic, cycloaliphatic, araliphatic or aromatic polyisocyanate. Normally diisocyanates are employed. Examples of suitable diisocyanates include ethylene diisocyanate, 1,6-hexamethylene diisocyanate (i.e. 1,6-diisocyanato hexane), isophorone diisocyanate, cyclohexane-1,4-diisocyanate, 4,4'-dicyclohexylmethane diisocyanate, cyclopentylene diisocyanate, p-tetramethylxylene diisocyanate (p-TMXDI) and its meta isomer (m-TMXDI), 2,6-toluene diisocyanate (and its hydrogenated derivative), 4,4'-diphenyl-methane diisocyanate (and its hydrogenated derivative), 2,4'-diphenylmethane diisocyanate (and its hydrogenated derivative), and 1,5-naphthylene diisocyanate. Mixtures of polyisocyanates can be used, particularly isomeric mixtures of the toluene diisocyanates or isomeric mixtures of the diphenylmethane diisocyanates (or their hydrogenated derivatives). Preferred polyisocyanates are cycloaliphatic polyisocyanates such as isophorone diisocyanate, p-TMXDI, m-TMXDI and 4,4'-dicyclohexylmethane diisocyanate, and aliphatic diisocyanates such as 1,6-hexamethylene diisocyanate.

The isocyanate-reactive compound for providing acid-functional groups used in the prepolymer synthesis is preferably an acid bearing polyol, particularly a diol, and preferably of low molecular weight (<500). The acid groups may e.g. be selected from carboxylic acid, sulphonic acid, sulphuric acid and phosphoric acid groups; when neutralised these yield corresponding anionic groups, viz $-CO_2^-$, $-SO_3^-$, $-OSO_3^-$ and $-PO_2^-$. Preferably, the acid group is a carboxylic acid or sulphonic acid group, with a carboxylic acid group often being selected (providing a carboxylate anion $-CO_2^-$ on neutralisation).

Particularly preferred carboxylic acid-bearing polyols are dihydroxyalkanoic acids of formula

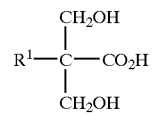

where $R^1$ is hydrogen or alkyl (usually 1–5C). The most preferred carboxyl-bearing polyol is 2,2,-bis (hydroxymethyl) propionic acid, alternatively named 2,2-dimethylol propionic acid (DMPA).

The acid groups may also usefully be provided by sulphonic acid groups. Such groups may be conveniently incorporated by employing diols bearing a sulphonic acid alkali metal salt group (usually the sodium salt) in the urethane prepolymer synthesis. Since such sulphonic acid groups are all fully neutralized prior to urethane synthesis, the need to effect neutralization subsequent to or during urethane synthesis is avoided. Examples of such diols include polyester diols which may be made employing 5-sulphoisophthalic acid sodium salt as an acid component in a polyester synthesis in conjunction with diol(s) (examples of which include diethylene glycol and neopentyl glycol) and other poly acids (examples of which include adipic acid, maleic acid and phthalic acid). The total diol component should be employed in a stoichiometric excess over the total acid component in order for the polyester to be hydroxyl terminated. Other examples of diols bearing a sulphonic acid alkali metal salt group are compounds which may be made by the conversion of the carboxyl groups of 5-sulphoisophthalic acid sodium salt to hydroxyalkyl ester groups by reaction with an alkane diol, for example the conversion of the carboxyl groups to —COOCH$_2$CH$_2$OH groups by reaction with 1,2-ethane diol, such a resulting diol having the formula

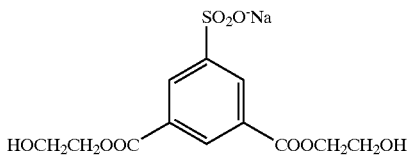

The isocyanate-reactive compound(s) for providing acid-functional groups is preferably used in an amount which provides 30 to 125 milliequivalents of such groups per 100 g of polyurethane polymer, more preferably 45 to 115 milliequivalents per 100 g of polymer.

In the case where DMPA is used for providing the acid functional groups, the polyurethane polymer usually contains about 2 to 20 weight % of units derived from this compound, more preferably about 5 to 15 weight %.

Besides contributing to water-solubility, the presence of acid groups in the polyurethane also provides improved hardness of the film.

The reactants used to form the prepolymer component may optionally include a compound(s) which is monofunctional with regard to isocyanate-reactive functionality. Such a compound will act as a chain capping material, i.e. will act as a chain terminator. Accordingly, if used, some of the prepolymer component will include polymer chains which are only terminated at one end by an isocyanate group, with the other end being inert to isocyanate-reactive groups. Therefore such chains in the prepolymer compound will not, unlike the fully isocyanate-terminated prepolymer, (i.e. terminated at each end by isocyanate groups), undergo chain extension, and this may usefully be employed to control the molecular weight of the final chain-extended polymer. Examples of such compounds include low molecular weight monohydric alcohols (e.g. 1-butanol) and polyethylene oxide compounds capped at one end by an inert group (e.g. alkoxy, such as methoxy) and at the other by an isocyanate-reactive group such as amino (preferably primary amino) or hydroxyl, for example,

where q can go from, for example, 4 to 100. (It will be noted that when an alkoxy polyethylene glycol chain stopper is used, this will also provide PEO groups in the polyurethane polymer).

The polyurethane polymer may also optionally (but less preferably) include units from other isocyanate-reactive compounds that are introduced during the prepolymer synthesis. These are usually diols, although diamines may e.g. alternatively or additionally be used. Examples of these compounds include polymeric diols having number average molecular weights in the range 400–6000. Such diols may be members of any of the chemical classes of polymeric diols used or proposed to be used in polyurethane formulations. In particular, the diols may be polyesters, polyesteramides, polyethers (other than ones providing PEO and/or PPO groups), polythioethers, polycarbonates, polyacetals, polyolefins or polysiloxanes. Preferred polyol molecular weights are from 700 to 2000.

Other examples of optional dials used in the prepolymer synthesis include organic dials having molecular weights below 400. Examples of such lower molecular weight diols include ethylene glycol, diethylene glycol, tetraethylene glycol, bis(hydroxyethyl) terephthalate, cyclohexane dimethanol, and furan dimethanol.

The polyurethane prepolymer may be prepared in conventional manner by reacting the organic polyisocyanate and isocyanate-reactive (usually entirely or mainly polyol) components under substantially anhydrous conditions at a temperature between about 30° C. and about 130° C. until reaction between the isocyanate groups and the isocyanate-reactive (usually all or mainly hydroxyl) groups is substantially complete. Since the prepolymer is to be wholly or substantially isocyanate-terminated it follows that a stoichiometric excess of the organic polyisocyanate component over the isocyanate reactive component should be employed. Preferably the reactants are used in amounts corresponding to a ratio of isocyanate groups to isocyanate-reactive (usually hydroxy) groups of from 1.1:1 to 2.5:1, more preferably from 1.3:1 to 2.0:1.

If desired, catalysts such as dibutylin dilaurate, stannous octoate, or certain tertiary amines may be used to assist prepolymer formation. An organic solvent may optionally be added before, during or after prepolymer formation to control the viscosity. Suitable solvents which may be used include acetone, methylethylketone, dimethylformamide, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, acetone and dialkyl ethers of glycol acetates or mixtures of N-methylpyrrolidone and methylethylketone.

As mentioned above the polyurethane films are normally made from an aqueous solution of the polyurethane, and it is therefore preferred to synthesise the polyurethane using a process whereby an aqueous solution results from the synthesis; this is then ready for use in preparing a film (possibly with concentration or dilution if desired). (Alternatively, it would be possible to convert the polyurethane solution to a dry polymer and reconstitute an aqueous polyurethane solution at a later time). It is to be understood that such aqueous polyurethane solutions may be cloudy as well as clear, the former case indicating the presence of a certain amount of dispersed (i.e. not dissolved—probably swollen) polymer of small particle size even though by far the major part of the polymer is dissolved. Such cloudy solutions can nevertheless still provide water-soluble films, and the term "solution" is intended to extend to cloudy solutions.

Accordingly there is further provided according to the invention a process for the production of an aqueous polyurethane polymer solution, which polyurethane polymer has:

0 to 35 weight %, based on the weight of polyurethane polymer, of poly(oxyethylene oxide) groups which have a chain length(s) corresponding to a number average molecular weight within the range of 200 to 5000 Daltons;

15 to 150 milliequivalents, per 100 g of polyurethane polymer, of acid-functional groups; and wherein at least 50% of the acid functional groups are neutralised, such neutralisation being with a base(s) at least part of which is a non-volatile base(s); said process comprising:

I synthesising a prepolymer component comprising an isocyanate-terminated polyurethane prepolymer, said component being formed from reactants which comprise:
  (i) at least one organic polyisocyanate,
  (ii) if poly(ethylene oxide) groups are present, at least one isocyanate-reactive compound providing said poly(ethylene oxide) groups in the resulting polyurethane polymer, and
  (iii) at least one isocyanate-reactive compound providing said acid-functional groups in the resulting polyurethane polymer;

II chain extending the prepolymer component using an active hydrogen component comprising an active hydrogen chain extending compound(s) to form said polyurethane polymer; and III forming an aqueous solution of said polyurethane polymer.

The stages II and III of the process are not necessarily carried out sequentially or as individual steps. For example, the chain extension step may be carried out simultaneously with the formation of the aqueous polyurethane polymer solution by dispersion of the polyurethane prepolymer into an aqueous medium containing an active hydrogen component and/or in which an active hydrogen component is formed (in the case where water provides an indirect chain extender—see later), or into an aqueous medium into which an active hydrogen component is subsequently incorporated. Dispersion of the prepolymer into water would form a solution of the prepolymer if sufficient of the acid groups had already been neutralised at that stage, so that a final polyurethane in aqueous solution would result after chain extension. It would, however, also be possible for a dispersion (rather than a solution) of the prepolymer to be formed on dispersion into water if insufficient of the acid groups had been neutralised at that stage; further neutralisation by the addition of more bases(s) before, during, or after chain extension (or over one or more of these periods) could then be effected so as to provide an aqueous solution of the final polyurethane polymer.

An aqueous polyurethane solution is preferably prepared by forming an aqueous solution of the polyurethane prepolymer component by dispersing it (optionally carried in an organic solvent medium) in an aqueous medium, preferably utilising only the self-dispersibility properties of the prepolymer arising from the acid anion groups and nonionic groups (if present) although free surfactant(s) may additionally be employed if desired (however, as mentioned above, a dispersion rather than a solution may be formed at this stage with further neutralisaton taking place subsequently— before, during or after chain extension, or over one or more of these periods) and chain extending the prepolymer using an active hydrogen component in the aqueous phase, an active hydrogen component being present and/or being formed in the aqueous phase during dispersion or added subsequently (i.e. chain-extension can take place during and/or after the dispersion into water in this embodiment).

The prepolymer may be dispersed in water using techniques well known in the art. Preferably, the prepolymer is added to the water with agitation or; alternatively, water may be stirred into the prepolymer.

Alternatively, although less preferably, the prepolymer may be chain extended to form the polyurethane polymer while dissolved in an organic solvent (usually acetone) (optionally containing water) followed by the addition of water to the polymer organic solution until water becomes the continuous phase and the subsequent removal of solvent (e.g. by distillation) to form an aqueous solution (or initially a polymer dispersion followed by further neutralisation to form a polymer solution—as discussed above mutatis mutandis) (the well-known "acetone process").

It will be apparent from the above discussion that neutralisation of the acid groups with a base(s) may be effected at any convenient stage of the synthesis and may be done over one or more stages. For example, neutralisation of acid groups may be effected at the prepolymer synthesis stage prior to (i.e. by neutralising the acid monomer), during or subsequent to the formation of the prepolymer (or over one or more of these stages) so that the prepolymer prior to chain extension is water-soluble or can form a dispersion in water (with further neutralisation being necessary in the latter case either of the prepolymer or of the final polyurethane to provide an aqueous polyurethane solution). Where neutralisation is effected subsequent to the synthesis stage of the prepolymer, this can e.g. be done by dispersing the prepolymer into water in parallel with a base(s) or into water containing a base(s) or to which a base(s) is subsequently added (to form a solution or dispersion as discussed above, the latter case requiring further neutralisation subsequently as discussed above). Such neutralisation may be carried out prior to and/or during and/or after the chain-extension step, depending on what stage(s) the active hydrogen component is incorporated with the water, with further neutralisation if necessary taking place after chain-extension in some embodiments (see supra).

An active hydrogen chain extender compound(s) of the active hydrogen component which may be used for the chain extension of the prepolymer may be an added primary or secondary aliphatic, alicyclic, aromatic, araliphatic or heterocyclic polyamine usually a diamine, or hydrazine or a substituted hydrazine. Water-soluble chain extenders are preferred.

Water itself may be used as an indirect chain-extender because it will convert some of the terminal isocyanate groups of the prepolymer to amino groups (via unstable carbamic acid groups) and the modified prepolymer molecules will then act as a chain-extender. [The exact mechanism whereby such chain extension takes place is not properly known to us. Possibly the water converts only one of the terminal isocyanate groups of prepolymer molecules to amino groups, leaving the other terminal isocyanate groups unaffected; chain extension may then occur by reaction of isocyanate and amino groups in such modified prepolymer molecules. Alternatively, or additionally, both terminal isocyanates of prepolymer molecules could be converted to amino groups, and the modified prepolymer molecules could then react with unmodified isocyanate terminated prepolymer molecules to cause chain extension. However, these are only theories and we do not wish to be bound by such theories]. In many urethane syntheses such chain extension is very slow compared to chain-extension using the above mentioned added active hydrogen chain extenders which will normally provide the predominant chain-extension reaction if used. However in the present invention, it has been discovered that the reaction of water with the prepolymer is much faster than in conventional urethane syntheses—so much so that it is a practical proposition for the chain extension to be effected solely as a result of the reaction of water with prepolymer, although such extension may of course be used in conjunction with extension employing an added chain extender. Chain extension resulting solely from the reaction of water with the prepolymer has a significant advantage because some added chain extenders may tend to be toxic.

Examples of added chain extenders useful herein include ethylene diamine, propylene diamine, butylene diamine, hexamethylene diamine, cyclohexylene diamine, piperazine, 2-methyl piperazine, phenylene diamine, tolylene diamine, xylylene diamine, 3,3-dinitrobenzidine, 4,4'-diaminodiphenylmethane, methane diamine, m-xylene diamine, isophorone diamine. Also amine terminated polyethylene glycols (i.e. polyethylene glycol diamines) such as the "Jeffamine" ED series; the structure of these materials is given by the manufacturers as $NH_2CH(CH_3)CH_2[OCH(CH_3)CH_2]_a[OCH_2CH_2]_b[OCH_2CH(CH_3)]_cNH_2$ where a+c= 2.5 and b is available at different values. Also materials such as hydrazine (e.g. in the form of its mono hydrate), azines such as acetone azine, substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine such as gamma hydoxylbutyric hydrazide, bis-semi-carbazide, and bis-hydrazide carbonic esters of glycols. Preferably an added chain extender is hydrazine (or its monohydrate).

Where a chain extender other than the modified prepolymer molecules formed by reaction with water is being used, for example a polyamine or hydrazine, it may in preferred embodiments be added to the aqueous solution (or dispersion) of prepolymer or, alternatively, it may already be present in the aqueous medium when the prepolymer is dispersed therein.

The active hydrogen component, besides containing chain-extending material, can optionally include a reactant(s) which is monofunctional with regard to isocyanate-reactivity. Such material(s) in the active hydrogen component will act as a chain-capping material, i.e. will act as a chain terminator. Such materials may be employed to control molecular weight of the final chain-extended polyurethane.

Examples of such compounds include $CH_3O(CH_2CH_2O)_nH$, $CH_3O(CH_2CH_2O)_m(CH_2CH(CH_3))_yCH_2CH(CH_3)NH_2$, where e.g. n can be 1 to 100, m can be 10 to 100 and y can be 2 to 15, and lower molecular weight monofunctional amines such as 1-butylamine.

The chain extension can be conducted at elevated, reduced or ambient temperatures. Convenient temperatures are from about 5° C. to 90° C.

The total amount of an added active hydrogen component if employed should preferably be approximately equivalent to the free-NCO groups in the prepolymer component, the ratio of isocyanate-reactive groups in the active hydrogen chain extender component to NCO groups in the prepolymer component preferably being in the range from 0.5/1 to 1.8/1, more preferably 0.7/1 to 1.5/1. Of course, where water is being employed as an indirect chain extender (which will always be the case if chain extension is performed in water—even if an added chain extender is also being used), such ratios will not be similarly applicable since the water, functioning both as an indirect chain extender and a dispersing medium, will be present in a gross excess relative to the free-NCO groups.

The resulting polyurethane polymer (after chain extension) will often have a number average weight within the range of 2000 to 50000 Daltons (however this is a very difficult property to measure in the invention polymers, although an approximate value may be determined using gel permeation chromatography using a polystyrene of known molecular weight as a standard).

[It is evident from the foregoing that the term "polyurethane" as used in this specification is intended to apply not only to polymers (or prepolymers) made by reacting only polyisocyanates and polyols to give urethane linkages, but also the polymers (or prepolymers) made by reacting polyisocyanates with other types of compound, in conjunction with polyols, having other types of isocyanate-reactive groups, thereby to give polymers, prepolymers or polymer segments comprising other types of linkages, for example urea or amide linkages].

With further regard to the neutralisation of the acid-functional groups, the neutralisation of at least 50% thereof (in order for the resulting film to be water-soluble) is brought about by the use of a base(s), at least part of which is non-volatile base(s) (which are very well known in the art) so as to convert the desired proportion of acid-functional groups to anionic salt groups together with the corresponding presence of cations derived from the base(s). Preferably at least 90%, and often 100% of the acid-functional groups in the final product are neutralised. At least a proportion of the base(s) used for neutralisation should be of the non-volatile type, preferably at least 50 weight % (based on the total weight of base(s) used), more preferably at least 90 weight %, and particularly 100 weight %, since volatile bases might be lost during film formation and storage of the films—leading to poor water-solubility. Bases which are of the non-volatile (i.e. permanent) type include the Group IA monovalent metal bases or basic salts, e.g. hydroxides, bicarbonates or carbonates (as appropriate) and particularly the hydroxides of Na, K and Li, and non-volatile water-soluble organic bases such as triethanolamine, 2-methyl-2-amino-1-propanol and quatemery ammonium hydroxides such as tetraethyl ammonium hydroxide. The most preferred permanent base is NaOH. Examples of volatile bases, if used, include ammonia and volatile aliphatic amines such as triethylamine and diethanolamine.

The amount of permanent base used may usefully in some circumstances be in excess of the amount of base(s) required to neutralise all of the acid-functional groups in the polyurethane polymer so that the resulting film contains residual permanent base from the neutralisation. The presence of such residual base in the film can provide a greater rate of dissolution in water. The amount of non-volatile base from neutralisation remaining in the film in such an embodiment is preferably up to 10 weight %, based on the weight of the film.

In a further embodiment of the invention the polymeric material providing binder material of the water-soluble film of the invention includes besides a polyurethane polymer(s) as defined supra a different polymer(s) which is other than a polyurethane but must not detract from the water-solubility of the resulting film.

Examples of such other polymers include PVA's, polyethylene oxide, starches, gelatin, cellulosics such as cellulose ethers (e.g. carboxymethyl cellulose and methyl cellulose) and hydrophobically modified cellulose, and acid-functional vinyl polymers, preferably acid-functional acrylic polymers, whose acid groups must be at least partly neutralised in order to provide the necessary water-solubility. Preferably the other polymer(s), if used, is selected from PVA and an acid-functional vinyl polymer. The acid groups are usually carooxylic acid groups or sulphonic acid groups.

Where a polymer(s) other than a polyurethane is included in the polymeric material of the film, it is preferably present in an amount of up to 80 weight %, based on the combined dry weight of all polymeric material of the film, more preferably up to 70 weight %, and still more preferably up to 50 weight %.

Preferably, as mentioned above, the other polymer (if used) is a PVA or acid-functional vinyl polymer, and the polyurethane and other polymer may be brought together by any suitable technique.

For example, it would be possible to simply blend together dry polymers and make an aqueous solution thereof for film formation, or effect film formation by melting processing of the dry blend. In another method, an aqueous solution of the polyurethane and an aqueous solution of the PVA or vinyl polymer, separately prepared, may be blended together (with agitation if necessary). In another method, the polyurethane prepolymer could in principle be dispersed into an aqueous solution of a performed PVA or vinyl polymer with simultaneous or subsequent chain extension of the prepolymer.

More preferred, however, in the case of using a vinyl polymer, is to perform the preparation of the vinyl polymer in-situ in the presence of the polyurethane polymer during and/or after its formation. In such an embodiment the vinyl monomer(s) for making the vinyl polymer may be introduced in the process of at any suitable stage. For example, where an aqueous solution of the prepolymer is formed in the process to make the polyurethane polymer (as is preferred) all of the vinyl monomer(s) may be added to the prepolymer prior to its dispersion into water, or all of the vinyl monomer(s) may be added subsequent to the dispersion, or part of the monomer(s) may be added to the prepolymer prior to dispersion and the remainder added subsequent to dispersion. In the case where all or part of the monomer(s) is added to the prepolymer prior to dispersion into water, such monomer(s) could be added to the prepolymer subsequent to its formation or prior to its formation, or some could be added subsequent to its formation and some added prior to its formation. In the case where any vinyl monomer(s) is added prior to the prepolymer formation it may usefully provide at least part of a solvent system for the reaction to form the prepolymer (if it possesses suitable solvent characteristics). This can be advantageous in that it may replace, in part or in total, organic solvents (such as N-methyl pyrrolidone) which are often included to control prepolymer viscosity; since the vinyl monomer(s) is subsequently polymerised, the resulting system will have a reduced or nil organic solvent content.

The vinyl polymer (if used) is normally made by an aqueous free-radical polymerisation process. When made in-situ, and where an aqueous solution of the polyurethane prepolymer is formed in the process to make the polyurethane polymer, with chain extension being carried out in the aqueous phase (as is preferred), the vinyl polymerisation may be performed simultaneously with the chain extension step, or performed subsequent to the chain extension step, or performed partly simultaneously with the chain extension step and partly subsequent to the chain extension step. If the "acetone process" is adopted for making the polyurethane polymer (see above for a discussion of this technique) wherein chain extension occurs in an organic solvent phase (usually acetone), the vinyl polymerisation is normally performed subsequent to the chain extension step after removal of solvent to form an aqueous solution of the polyurethane polymer (although it would, in principle, be possible to perform the vinyl polymerisation in the solvent, disperse the urethane/vinyl polymer into water, and then remove the solvent).

All of the vinyl monomer(s) to be polymerised may be present at the commencement of the vinyl polymerisation, or alternatively in cases where all or part of the monomer(s) to be polymerised has been introduced subsequent to the formation of an aqueous polyurethane prepolymer solution, or, in the case of using the "acetone process", normally subsequent to the formation of the chain extended polyurethane aqueous solution (although it would, in principle, be possible to add the vinyl monomer(s) at the prepolymer formation stage), some or all of that monomer(s) may be added to the reaction medium during the course of the polymerisation (in one or more stages or continuously).

By a vinyl polymer herein is meant a homo or copolymer derived from the addition polymerisation (using a free radical initiated process and usually in an aqueous medium) of one or more olefinically unsaturated monomers. To provide adequate water-solubility characteristics, the vinyl polymer is preferably formed from a monomer mixture which contains 5 to 40 weight % of acid functional monomer(s), more preferably 8 to 15 weight %, and still more preferably 8 to 14 weight % (based on the total weight of vinyl monomers used for the polymerisation).

Particularly preferred vinyl polymers are acrylic polymers, i.e. based predominantly on at least one ester of acrylic or methacrylic acid, and with the acid groups preferably being provided by acrylic acid and/or methacrylic acid. Alternatively, in cases where the acid groups are sulphonic acid groups, the acid groups may be provided by monomers such as vinyl sulphonic acid, styrene sulphonic acid and 2-acrylamido-2-methylpropane sulphonic acid (optionally in the form of their alkali metal salts, e.g. their sodium salts).

The polymerisation of the at least one vinyl monomer to form the vinyl polymer will require the use of a free-radical-yielding initiator(s) to initiate the vinyl polymerisation. Suitable free-radical-yielding initiators include inorganic peroxides such as K, Na or ammonium persulphate, hydrogen peroxide, or percarbohates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and i-ascorbic acid. Azo compounds such as azoisobutyronitrile may also be used. Metal compounds such as Fe.EDTA (EDTA is ethylene diamine tetracetic acid) may also be usefully employed as part of the redox initiator system. We prefer to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range of 0.05 to 6 weight % based on the total vinyl monomer(s) used.

An aqueous vinyl polymerisation carried out in the absence of the polyurethane normally needs to be performed in the presence of a stabilising and/or dispersing material, and when making an aqueous latex of a vinyl polymer (which after polymerisation can be converted to a solution by neutralisation of acid groups), a conventional emulsifying agent would need to be employed (e.g. anionic and/or non-ionic emulsifiers such as Na salts of dialkysulphosuccinates, Na salts of sulphated oils, Na salts of alkyl sulphonic acids, Na, K and ammonium alkyl sulphates, $C_{22-24}$ fatty alcohols, ethyloxylated fatty acids and/or fatty amides, and Na salts of fatty acids such as Na stearate and Na oleate; the amount used is usually 0.1 to 5% by weight on the weight based on the total olefinically unsaturated monomer(s) used). When incorporated using an in-situ process, however, the polyurethane polymer containing anionic (and optionally but preferably nonionic) dispersing groups usually removes the requirement for the use of a separately added conventional emulsifying agent since the polyurethane itself acts an effective dispersant for the vinyl polymerisation, although a conventional emulsifier can be still employed if desired. (Indeed it may be mentioned that it is often very difficult, and sometimes impossible, to incorporate acid functional monomers in in-situ acrylic polymerisations (because of colloid instability leading to coagulation during the acrylic polymerisation). Therefore, a major advantage of employing PEO-containing polyurethanes of the invention in this embodiment is that they provide sufficient colloid stability to allow the incorporation of acid functional comonomers).

Examples of vinyl monomers which may be used to form the vinyl polymer include 1,3-butadiene, isoprene, styrene, α-methyl styrene, acrylonitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $$CH_2=CR^2COOR^3$$

wherein $R^2$ is H or methyl and $R^3$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethylmethacrylate 2-hydroxypropyl methacrylate, 2-hydroxypropyl acrylate, and their modified analogues like Tone M-100 (Tone is a trademark of Union Carbide Corporation). Olefinically unsaturated carboxylic acid(s) must of course be employed, e.g. monocarboxylic and/or dicarboxylic acids, such as acrylic acid, methacrylic acid, beta-carboxyethyl acrylate, fumaric acid, and itaconic acid and/or sulphonic acids such as vinyl sulphonic acid, styrene sulphonic acid and 2-acrylamido-2-methylpropane sulphonic acid (optionally in the form of their sodium salts). The amount is preferably sufficient to provide an amount of acid monomer(s) within the range of 5 to 40 weight % based on the total weight of vinyl monomers used in the polymerisation.

Particularly preferred are vinyl polymers made from a monomer system comprising at least 40 weight % of one or more monomers of the formula $CH_2=CR^2COOR^3$ defined above. Such preferred polymers are defined herein as acrylic polymers. More preferably, the monomer system contains at least 50 weight % of such monomers, and particularly at least 60 weight %. The other monomer(s) in such acrylic polymer (if used), besides acid monomer(s) (which is essential as discussed above), may include one or more of the other vinyl monomers mentioned above, and/or may include ones different to such other monomers. Styrene is a useful other monomer. Preferred (meth)acrylic ester monomers include methyl acrylate and ethyl acrylate; others which may be used include methyl methacrylate, n-butyl acrylate, n-butyl methacrylate, and 2-ethylhexyl acrylate.

The glass transition temperature (Tg) of the vinyl polymer may vary within a wide range, a possible range being from −50 to 120° C. (The Tg of a vinyl polymer, as is well known, is the temperature at which the polymers passes from a glassy, brittle condition to a rubbery or plastic one; it may be calculated using the well known Fox equation, or determined experimentally using differential scanning calorimetry). Its number average molecular weight will often be in the range of from 1,000 to 300,000 Daltons. The vinyl polymer is preferably of low number average molecular weight, e.g. in the range 1,000 to 10,000 Daltons, more preferably 1,000 to 5,000 Daltons (and in such cases a chain transfer agent will usually be employed in the vinyl polymerisation). (The number average molecular weight of a vinyl polymer may be determined using gel permeation chromatography employing a polystyrene standard of known molecular weight).

Neutralisation of the acid groups of the vinyl polymer may be effected at any convenient stage (unless of course the acid monomers employed in their synthesis are already in neutralised salt form, so that such subsequent neutralisation is unnecessary), e.g. before, during, or after admixture with the polyurethane in the case of using a preformed vinyl polymer (and over one or more stages if required). In the case of using in-situ formed vinyl polymer, neutralisation may be effected at any convenient stage of the polyurethane preparation (and over one or more stages if required). In particular, and when feasible, the neutralisation of the vinyl acid groups may be effected concurrently with the acid groups of the polyurethane polymer.

It is to be further understood that the same requirements regarding the nature of the bases (permanent or volatile) apply equally to the neutralisaton of acid groups of the vinyl polymer, if used (and in fact, the same base(s) system as used for the polyurethane polymer will often be employed).

It is further to be understood that any reference to a polyurethane film herein includes a film the binder of which optionally contains another polymer(s) besides a polyurethane (as discussed above).

It is to be understood that the film of the invention, except as a possible stage in its production, is not intended to be in the form of a coating on a substrate, i.e. it is "free-standing" and normally self-supporting.

Preferred dry film thicknesses for the films of the invention are within the range of from 5 to 150 μm, preferably 10 to 100 μm and especially 20 to 50 μm.

Polyurethane films according to the invention could be used to provide packaging film constructions of the monolayer or the laminate type. It would also in principle be possible to employ a laminate film construction of a polyurethane film with a film of a different type, e.g. a PVA film or a carboxylated acrylic film.

As discussed above, the invention films are normally made by casting from an aqueous solution, although in principle any other feasible method could be used (such as spraying onto and then removing from a substrate, and blow film extrusion of dry polymer). When a film is to be made by casting, a solution of the polymer system, together with any desired additive(s), could e.g. be poured onto a suitable flat horizontal mould surface (e.g. made of a plastics, metal, or glass material) and the aqueous carrier phase removed by natural or accelerated evaporation (e.g. at room temperature or at an elevated temperature as for example in an oven). A film could also be made by casting onto a flat surface (preferably continuous casting on a moving belt) using e.g. an applicator bar to determine film thickness rather than mould dimensions. Laminate films may be formed by techniques such as sequential casting (e.g. by roller coating or using a doctor blade), lamination of two preformed films, and co-extrusion.

The water-soluble films of the invention may also include if desired materials such as slip aids, waxes, colourants, wetting agents (surfactants), fillers (e.g. silica or starch); chelating agents, and plasticisers.

The film may also contain a sequestering agent for assisting solubility in tap water (if used to dissolve the film). A sequestering agent could also be present in the packaged contents (e.g. by adding it to the formulation being packaged) or in the water used to dissolve the film when in use.

Packaging such as a sachet made from the invention polyurethane film can be formed and filled using standard techniques (such as thermoforming or vertical form-fill-sealing).

General Test for Testing the Solubility of Films in Water

The solubility of the films is determined by mounting the film of whatever thickness in a 35 mm slide frame and immersing the slide mount into 500 cm$^3$ of water (distilled, de-ionised or tap), in a 600 cm$^3$ beaker, maintained at the temperature at which dissolution is to be tested, usually 10° C. to 20° C. The slide mount is clamped with the film immersed and the water stirred at 400 rpm using a 2.5 cm length magnetic stirrer bar.

The dissolution time is measured as the time taken for complete dissolution of the film into a clear or cloudy solution (after breaking free of the slide frame) having no discernable fragments of the film.

If the dissolution time is greater than 10 minutes, at the thickness of the film and water temperature employed, the film is deemed to be insoluble for the purposes of the invention.

The present invention is now further illustrated, but in no way limited, by reference to the following worked examples. The prefix C before an example number denotes that it refers to a comparative example. Unless otherwise specified all parts, percentages, and ratios are on a weight basis.

In the examples the following abbreviations are used:

| | |
|---|---|
| 2,2-bis(hydroxymethyl) propionic acid | DMPA |
| polyethylene glycol (Mn 1000) | PEG 1000 |
| polypropylene glycol (Mn 1000) | PPG 1000 |
| methoxy polyethylene glycol (Mn 750) | MPEG 750 |
| isophorone diisocyanate | IPDI |
| 1,6-diisocyanatohexane | HDI |
| N-methylpyrrolidone | NMP |
| dibutyltin dilaurate | DBTDL |
| Mn | No. average molecular weight |

Procedure for Prepolymer Preparation

A typical procedure for the preparation of polyurethane prepolymer is as follows. The diols employed are preheated to melt or to reduce viscosity if necessary. Diols, DMPA and solvent (if used) are added to a dry 2-liter or 1-liter 4-necked flask, being the reaction vessel. For solvent free preparation, DMPA is ground in a grinder for 40 seconds prior to use. A stirrer and stirrer gland are added to the flask and clamped in position. The stirrer shaft is connected to a stirrer motor and slow agitation is started. The flask is fitted with a water condenser and nitrogen supply, and a subaseal and silicone stopper inserted into the remaining open necks. A thermocouple is pushed through the subaseal until the tip is at least 15 mm below the surface of reactants. When the contents of reaction flask are mobile, the isocyanate employed is added from a beaker and after a few minutes to allow for mixing, catalyst is added if required. The reaction flask is heated to typically about 90° C. using a hot air blower and any exotherm is controlled using a cold water bath. A pre-warmed isomantle is placed under the reaction flask to maintain the contents at about 90° C. for the duration of the prepolymer-forming reaction. After 3 hours at about 90° C. a sample is withdrawn by pipette for isocyanate determination. If the NCO value is below theoretical, the prepolymer reaction is complete. If above theoretical it must be heated further and the NCO determination repeated until below theoretical. If a low molecular weight monohydric alcohol (e.g. 1-butanol) (chain stopper) Is used, it Is added down the condenser after 3 hours reaction and the reaction is continued for a further 2 hours, the NCO determination to check if the prepolymer reaction is complete being carried out at that stage.

Procedure for Dispersion of Prepolymer in Water

A typical procedure for the dispersion of prepolymer into water is as follows. Water, neutralising agent, added chain-extender (if used) and any surfactant or defoamer are charged into a 3-liter or 2-liter flask (being the dispersion vessel) which is clamped in position. A thermocouple is clamped in position and agitation started. The dispersion vessel and its contents are prewarmed using a hot air blower or isomantle. Hot prepolymer is poured into the dispersion vessel until the required amount has been added (typically over about 10 minutes). After 20 minutes any remaining neutralising agent is added to the dispersion. Cooling may be required or the temperature allowed to drift upwards. About 1 to 1.5 hours after prepolymer dispersion, agitation is ceased. In one variation of the procedure (variation 1), the hot prepolymer is first added to a heated addition funnel with a large bore and charged to the dispersion from the funnel (this allows a more controlled addition of prepolymer, as might be required in a large scale plant procedure). In another variation of the procedure (variation 2), 20–30% of the amount of neutralising agent required for total neutralisation of the acid groups is contained in the dispersion water (before addition of the prepolymer). When prepolymer dispersion has been completed, stirring is continued for 20 minutes and the remainder of the neutralising agent required for total neutralisation, or a slight excess of this quantity (up to about a 10 weight % excess based on the amount required for complete neutralisation), is added over 10–30 minutes.

EXAMPLE 1

In this example, an added chain extender, hydrazine monohydrate, is employed in addition to chain extension resulting from the reaction of water with prepolymer.

To a 1 liter reaction vessel were added 2,2-bis (hydroxymethyl) propionic acid (DMPA) (50.00 g), polypropylene glycol, (Mn 1,000; 183.20 g) (PPG 1000), polyethylene glycol (Mn 1,000; 61.05 g) (PEG 1000) and N-methylpyrrolidone (125 g), followed by isophorone diisocyanate (IPDI) (205.75 g). The contents were stirred under a nitrogen atmosphere and heated to 50° C. At this temperature the catalyst dibutyltin dilaurate (0.50 g) was added. The contents were then heated to 90° C. and this temperature was maintained for 3 hours to form the urethane prepolymer.

To a separate 2 liter dispersion vessel were added de-ionised water (1,251.67 g), sodium hydroxide (47.43 g of a 30 weight % solution in water—required for total neutralisation of the acid groups) and hydrazine hydrate (11.03 g). The urethane prepolymer (590 g) was then added to the dispersion vessel to produce a slightly cloudy aqueous urethane solution of solids content 25.7 weight % at pH 7.8.

The above recipe can be summarised as follows:

| Prepolymer composition (solids) (weight %) | |
| --- | --- |
| IPDI | 41.15 |
| PEG 1000 | 12.21 |
| PPG 1000 | 36.64 |
| DMPA | 10.00 |
| Total | 100% |

NCO: OH ratio=1.5

Film cast from the above aqueous solution was shown to completely dissolve in tap water (20° C.) to form a clear solution in less than 60 seconds for a film thickness of 0.12 mm.

Mechanical properties of further film made from the solution (0.038 mm thick; this film dissolved in 20 seconds in tap water at 10° C.) (and of the films of the following examples) were determined and are shown in Table 1.

EXAMPLE 2

In this example, an added chain extender, hydrazine monohydrate is employed in addition to chain extension resulting from the reaction of water with prepolymer.

To a 2-liter reaction vessel were added 2,2-bis (hydroxymethyl) propionic acid (DMPA) (55.00 g), polyethylene glycol (Mn 1,000; 69.45 g) (PEG 1000), methoxy polyethylene glycol, (Mn 750; 27.50 g) (MPEG 750), polypropylene glycol (Mn 1000; 174.02 g) (PPG 1000) and N-methylpyrrolidone (61.17 g), followed by isophorone diisocyanate (IPDI) (224.03 g). The contents were stirred under a nitrogen atmosphere and heated to 39° C. At this temperature the catalyst dibutyltin diaurate (0.5442 g) was added and heating continued. The temperature was maintained at 90° C. for three hours to form the urethane prepolymer.

To a separate 3-liter dispersion vessel were added de-ionised water (1,204.81 g), hydrazine monohydrate (12.1392 g), all of a 10% sodium hydroxide aqueous solution required for total neutralisation of the acid groups (134.06 g of solution) and five drops of a defoamer. The urethane prepolymer (500 g) at 85° C. was added to the dispersion vessel (heated to 30° C.) via an addition funnel (as described in variation 1) to produce a cloudy urethane solution of solids content 25.44 wt % at pH 8.03.

The above recipe can be summarised as follows;

| Prepolymer composition (solids) (wt %) | |
| --- | --- |
| DMPA | 10.00 |
| MPEG 750 | 5.00 |
| PEG1000 | 12.63 |
| PPG1000 | 31.64 |
| IPDI | 40.73 |
| Total | 100% |

NCO: OH ratio=1.5

Film cast from the above aqueous solution dissolved well in tap water (20° C.) in less than 60 seconds to produce a solution with a slight blue haze.

Mechanical properties of further film made from the solution (0.037 mm thickness; this film dissolved in 14 seconds in tap water at 10° C.) were determined (see Table 1).

EXAMPLE C3

In this example, an added chain extender, hydrazine monohydrate, is employed in are addition to chain extension resulting from the reaction of water with prepolymer. In addition, the polyurethane polymer formed contains in excess of 35 weight % of PEO groups (in fact about 50 weight %).

To a 2-liter reaction vessel were added 2,2-bis (hydroxymethyl) propionic acid (DMPA) (55.00 g), polyethylene glycol (Mn 1,000; 287.01 g) (PEG 1000), methoxy polyethylene glycol, (Mn 750; 27.50 g) (MPEG 750) and N-methylpyrrolidone (61.11 g), followed by 1,6-diisocyanatohexane (HDI) (180.49 g). The contents were stirred under a nitrogen atmosphere and heated to 90° C. as described in the procedure for prepolymer preparation, but using a reaction time of two hours.

To a separate 3-liter dispersion vessel were added de-ionised water (1,205.94 g), hydrazine hydrate (12.0506 g), all of a 10% sodium hydroxide aqueous solution required for total neutralisation of the acid groups (134.20 g of solution) and five drops of a defoamer. The urethane prepolymer (500 g) at 8° C. was added to the dispersion vessel (heated to 25° C.) via an addition funnel (as described in variation 1 of the procedure for prepolymer dispersion) and stirring continued for 2 hours 40 minutes to produce a cloudy urethane solution at pH 9.03.

The above recipe can be summarised as follows;

| Prepolymer composition (solids) (wt %) | |
| --- | --- |
| DMPA | 10.00 |
| PEG1000 | 52.18 |
| MPEG750 | 5.00 |
| HDI | 32.82 |
| Total | 100% |

NCO: OH ratio=1.5

Film cast from the above aqueous solution was too soft and tacky to be of any practical use for mechanical property testing (see Table 1).

EXAMPLE 4

In this example, chain extension takes place solely as a result of the reaction of water with prepolymer.

To a 2-liter reaction vessel were added 2,2-bis (hydroxymethyl) propionic acid (DMPA) (55.00 g), polyethylene glycol (Mn 1,000; 27.50 g) (PEG 1000), polypropylene glycol, (Mn 1,000; 241.18 g) (PPG 1000) and N-methylpyrrolidone (61.11 g), followed by isophorone diisocyanate (IPDI) (226.32 g). The contents were stirred under a nitrogen atmosphere and heated to 93° C. and this temperature was maintained for five hours, 1-butanol (7.13 g) and N-methylpyrroldinone (0.79 g) being added after 3 hours. This reaction resulted in the formation of the urethane prepolymer.

To a separate 3-liter dispersion vessel were added de-ionised water (1,545.1 g), 25% of a 10% sodium hydroxide aqueous solution required for total neutralisation (33.12 g of solution) and four drops of a defoamer. The urethane prepolymer (500 g) at 85° C. was added to the dispersion vessel (heated to 30° C.) via an addition funnel (as described in variation 1 of the procedure for prepolymer dispersion) and a slight excess of the remainder of the sodium hydroxide solution required for total neutralisation of the acid groups added after the completion of dispersion (variation 2). The solution was heated to 40° C. and stirring continued for about 1.5 hours as the solution cooled to room temperature. This resulted in a cloudy aqueous urethane solution of solids 21.68 wt % at pH 7.30.

The above recipe can be summarised as follows;

| Prepolymer composition (solids) (wt %) | |
|---|---|
| DMPA | 9.87 |
| PEG1000 | 4.93 |
| PPG1000 | 43.29 |
| 1-butanol | 1.28 |
| IPDI | 40.62 |
| Total | 100% |

NCO: OH ratio=1.5

Film cast from the above aqueous solution formed a cloudy solution in tap water (20° C.) in less than 30 seconds for a film thickness of 0.077 mm.

Mechanical properties of further film made from the solution (0.036 mm thickness; this film dissolved in 31 seconds in tap water at 10° C.) were determined (see Table 1).

EXAMPLE 5

In this example, the chain extension takes place solely as a result of the reaction of water with prepolymer.

To a 2-liter reaction vessel were added 2,2-bis (hydroxymethyl) propionic acid (DMPA) (66.00 g), polyethylene glycol (Mn 1,000; 67.16 g) (PEG 1000), polypropylene glycol, (Mn 1,000; 172.77 g) (PPG 1000) and N-methylpyrrolidinone (75.00 g), followed by isophorone diisocyanate (IPDI) (244.08 g). The contents were stirred under a nitrogen atmosphere and heated to 93° C. and this temperature maintained for five hours, 1-butanol (7.73 g) and N-methylpyrrolidinone (1.05 g) being added after 3 hours. This reaction resulted in the formation of the urethane prepolymer.

To a separate 3-liter dispersion vessel were added de-ionised water (1,388.8 g), 21.33% of a 10% sodium hydroxide aqueous solution required for total neutralisation of the acid groups (33.12 g of solution) and three drops of a defoamer. The urethane prepolymer (500 g) at 85° C. was added to the dispersion vessel (heated to 30° C.) via an addition funnel (as described in variation 1 of the procedure for prepolymer dispersion) and a slight excess of the remainder of the sodium hydroxide solution required for total neutralisation added after the completion of dispersion (variation 2). The solution was heated to 40° C. and stirring continued for about 1.5 hours as the solution cooled to room temperature. This resulted in an almost clear aqueous urethane solution of solids 22.54 wt % at pH 7.38.

The above recipe can be summarised as follows;

| Pre polymer composition (solids) (wt %) | |
|---|---|
| DMPA | 11.83 |
| PEG1000 | 12.04 |
| PPG1000 | 30.98 |
| 1-butanol | 1.39 |
| IPDI | 43.76 |
| Total | 100% |

NCO: OH ratio=1.5

Film cast from the above aqueous solution dissolved to a very slightly hazy solution in tap water (20° C.) in less than 30 seconds for a film thickness of 0.05 mm.

Mechanical properties of further film made from the solution (0.038 mm thickness; this film dissolved in 14 seconds in tap water at 1° C.) were determined (see Table 1).

EXAMPLE 6

In this example, the chain extension takes place solely as a result of the reaction of water with prepolymer.

To a 2-liter reaction vessel were added 2,2-bis (hydroxymethyl) propionic acid (DMPA) (55.00 g), polyethylene glycol (Mn 1,000; 67.16 g) (PEG 1000), polypropylene glycol, (Mn 1,000; 201.52 g) (PPG 1000) and N-methylpyrrolidinone (61.11 g), followed by isophorone diisocyanate (IPDI) (226.32 g). The contents were stirred under a nitrogen atmosphere and heated to 93° C. and this temperature was maintained for five hours, 1-butanol (4.75 g) and N-methlypyrrolidone (0.53 g) being added after three hours. This reaction resulted in the formation of urethane prepolymer.

To a separate 3-liter dispersion vessel were added de-ionised water (1,653.54 g), 25% of a 10% sodium hydroxide aqueous solution required for total neutralisation of the acid groups (33.28 g of solution) and four drops of a defoamer. The urethane prepolymer (500 g) at 85° C. was added to the dispersion vessel (heated to 30° C.) via an addition funnel (as described in variation 1 of the procedure for prepolymer dispersion) and a slight excess of the remainder of the sodium hydroxide solution required for total neutralisation added after the completion of dispersion (variation 2). The solution was heated to 40° C. and stirrng continued for about 1.5 hours as the solution cooled to room temperature. This resulted in a blue tinted urethane solution of solids content 20.28 wt % at pH 7.3.

The above recipe can be summarised as follows;

| Pre polymer composition (wt %) | |
|---|---|
| DMPA | 9.91 |
| PEG1000 | 12.11 |
| PPG1000 | 36.33 |
| 1-butanol | 0.86 |
| IPDI | 40.80 |
| Total | 100% |

NCO: OH ratio=1.5

Film cast from the above aqueous solution dissolved in 45 seconds in tap water (20° C.) to produce a hazy solution for a film thickness of 0.052 mm.

Mechanical properties of further film made from the solution (0.042 mm thickness) were determined (see Table 1).

EXAMPLE 7

In this example, the chain extension takes place solely as a result of the reaction of water with prepolymer.

To a 2-liter reaction vessel were added 2,2-bis(hydroxymethyl) propionic acid (DMPA) (55.00 g), polyethylene glycol (Mn 1,000; 67.16 g) (PEG 1000), polypropylene glycol, (Mn 1,000; 201.52 g) (PPG 1000) and N-methylpyrrolidinone (61.11 g), followed by isophorone diisocyanate (IPDI) (226.32 g). The contents were stirred under a nitrogen atmosphere and heated to 93° C. and this temperature was maintained for five hours, 1-butanol (7.27 g) and N-methlypyrrolidinone (0.89 g) being added after three hours. This reaction resulted in the formation of the urethane prepolymer.

To a separate 3-liter dispersion vessel were added de-ionised water (1,545.1 g), 25% of a 10% sodium hydroxide aqueous solution required for total neutralisation of the acid groups (33.12 g of solution) and four drops of a defoamer. The urethane prepolymer (500 g) at 85° C. was added to the dispersion vessel (heated to 30° C.) via an addition funnel (as described in variation 1 of the procedure for prepolymer dispersion) and a slight excess of the remainder of the sodium hydroxide solution required for total neutralisation added after the completion of dispersion (variation 2). The solution was heated to 40° C. and stirring continued for about 1.5 hours as the solution cooled to room temperature. This resulted in a blue/grey urethane solution of solids content 21.30 wt % at pH 7.25.

The above recipe can be summarised as follows;

| Pre polymer composition (solids) (wt %) | |
|---|---|
| DMPA | 9.87 |
| PEG1000 | 12.05 |
| PPG1000 | 36.16 |
| 1-butanol | 1.30 |
| IPDI | 40.61 |
| Total | 100% |

NCO: OH ratio=15

Film cast from the above aqueous solution dissolved in 40 seconds in tap water (20° C.) to produce a solution with a very slight haze for a film thickness of 0.073 mm.

Mechanical properties of further film made from the solution (0.041 mm thickness; this film dissolved in 16 seconds in tap water at 10° C.) were determined (see Table 1).

EXAMPLE 8

In this example the chain extension takes place solely as a result of the reaction of water with prepolymer.

To a 2-liter reaction vessel were added 2,2-bis (hydroxymethyl) propionic acid (DMPA) (55.00 g), polyethylene glycol (Mn 1,000; 67.16 g) (PEG 1000), polypropylene is, glycol, (Mn 1,000; 201.52 g) (PPG 1000) and N-methylpyrrolidone (61.11 g), followed by isophorone diisocyanate (IPDI) (226.32 g). The contents were stirred under a nitrogen atmosphere and heated to 93° C. and this temperature was maintained for five hours, 1-butanol (11.87 g) and N-methlypyrrolidinone (1.32 g) being added after three hours. This reaction resulted in the formation of urethane prepolymer.

To a separate 3-liter dispersion vessel were added de-ionised water (1,356.6 g), 25% of a 10% sodium hydroxide aqueous solution required for total neutralisation of the acid groups (32.84 g of solution) and four drops of a defoamer. The urethane prepolymer (500 g) at 85° C. was added to the dispersion (vessel heated to 30° C.) via an addition funnel (as described in variation 1 of the procedure for prepolymer dispersion) and a slight excess of the remainder of the sodium hydroxide solution required for total neutralisation added after the completion of dispersion (variation 2). The solution was heated to 40° C. and stirring continued for about 1.5 hours as the solution cooled to room temperature. This resulted in a urethane solution of solids 23.40 wt % at pH 7.31.

The above recipe can be summarised as follows;

| Pre polymer composition (solids) (wt %) | |
|---|---|
| DMPA | 9.79 |
| PEG1000 | 11.95 |
| PPG1000 | 35.87 |
| 1-butanol | 2.11 |
| IPDI | 40.28 |
| Total | 100% |

NCO: OH ratio=1.5

Film cast from the above aqueous solution dissolved in less than 60 seconds in tap water (20° C.).

Mechanical properties of further film made from the solution (thickness 0.043 mm; this film dissolved in 15 seconds at 10° C. in tap water) were determined (see Table 1).

TABLE 1

Mechanical Properties of Films

| Ex. No. | Tensile Strength* (Mpa) | 100% Modulus* (Mpa) | Elongation to break* (%) | Tear Strength** (Kg.mm⁻¹) |
|---|---|---|---|---|
| 1 | 14.4 | 8.7 | 387 | 27.0 |
| 2 | 9.1 | 6.3 | 363 | nm |
| C3 | Too soft and tacky for mechanical testing | | | |
| 4 | 14.3 | 8.7 | 427 | 14.2 |
| 5 | 16.5 | 13.4 | 305 | 1.3 |
| 6 | 13.9 | 7.9 | 550 | 22.8 |
| 7 | 10.7 | 7.7 | 380 | 13.1 |
| 8 | 9.2 | 7.3 | 377 | 6.0 |

*determined using an Instron Tensometer
**determined using an Elmendorf machine
nm  not measured

What is claimed is:

1. Water-soluble packaging comprising an enveloping film which is soluble in water at temperatures between 5 and 35° C., said enveloping film comprising at least one polyurethane polymer, which at least one polyurethane polymer comprises:

2 to 35 weight %, based on the weight of polyurethane polymer, of poly(ethylene oxide) groups which have a chain length(s) corresponding to a number average molecular weight within the range of from 300 to 3,000 Daltons;

15 to 150 millequivalents, per 100 g of polyurethane polymer, of acid-functional groups; and wherein at least 50 weight% of the acid-functional groups are neutralised, such neutralisation being with at least one base, at least part of which is at least one non-volatile base;

and said at least one polyurethane polymer is a chain extended product formed using:

(A) a prepolymer component comprising an isocyanate-terminated polyurethane prepolymer, said component being formed from reactants which comprise:
  (i) at least one organic polyisocyanate,
  (ii) at least one isocyanate-reactive compound providing said poly(ethylene oxide) groups in the resulting polyurethane polymer, and
  (iii) at least one isocyanate-reactive compound providing said acid-functional groups in the resulting polyurethane polymer, and (B) an active hydrogen component comprising at least one active hydrogen chain-extending compound.

2. Water-soluble packaging according to claim 1, in the form of a sachet, capsule or bag.

3. Water-soluble packaging according to claim 1, wherein said enveloping film has a monolayer construction.

4. Water-soluble packaging according to claim 1, wherein said enveloping film has a laminate construction.

5. A combination of water-soluble packaging and a material packaged therein, wherein said water-soluble packaging comprises the water-soluble packaging according to claim 1.

6. A method for packaging a material comprising inserting the meterial in the water-soluble packaging according to claim 1.

* * * * *